Feb. 20, 1923.
H. P. GERDIL.
ROTARY CUTTING TOOL.
FILED AUG. 13, 1919.
1,446,342.
3 SHEETS—SHEET 1.
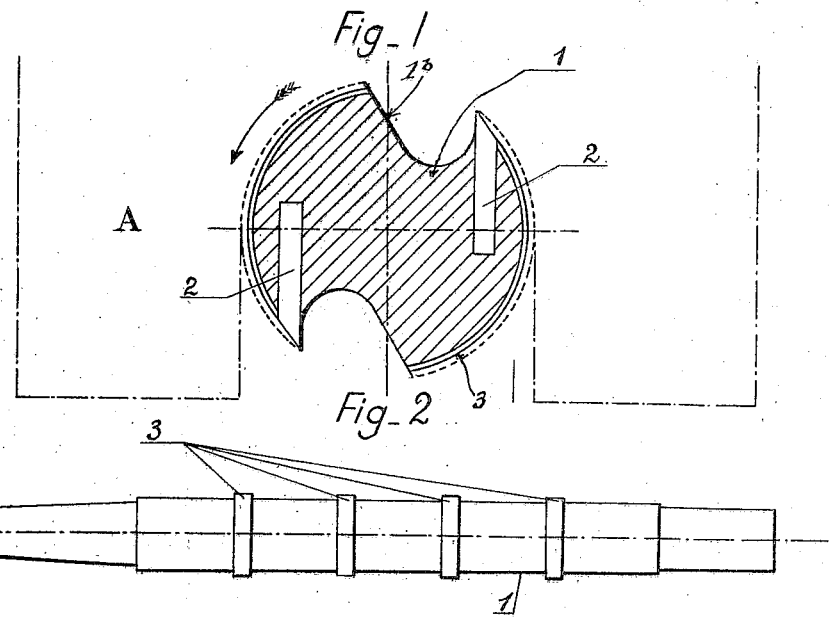
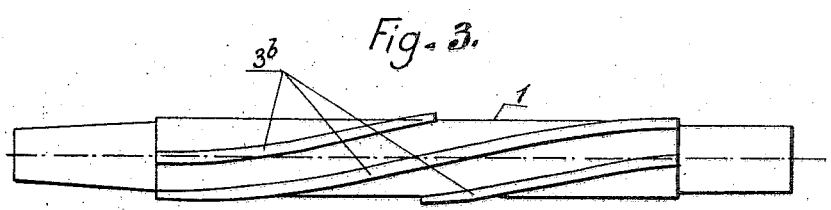
Inventor
Henri Prosper Gerdil
by
his Attorney Feb. 20, 1923.
H. P. GERDIL.
ROTARY CUTTING TOOL.
FILED AUG. 13, 1919.
1,446,342.
3 SHEETS—SHEET 2
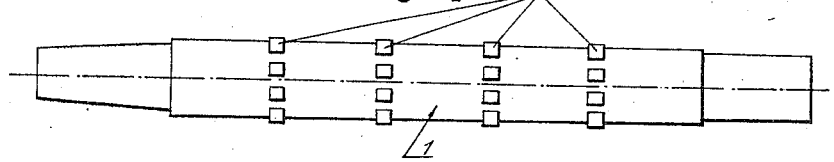
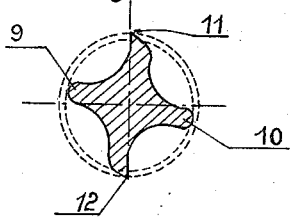
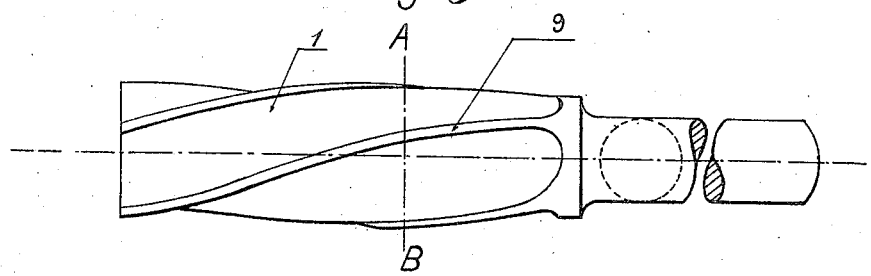
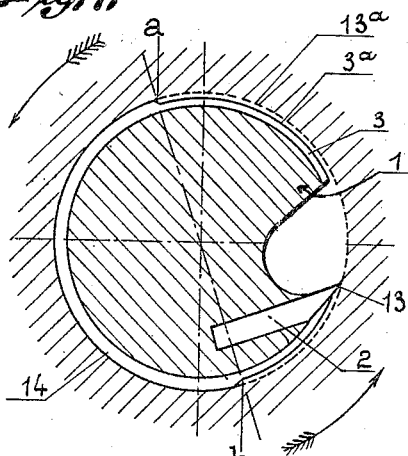
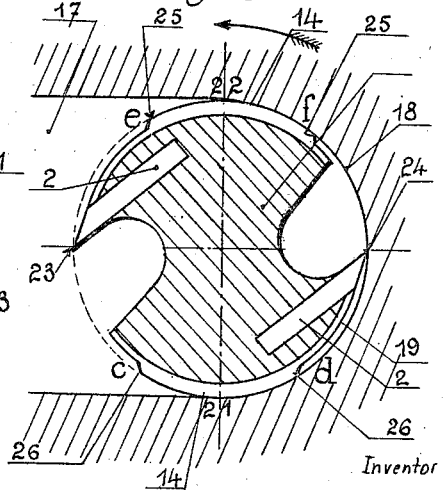
Inventor
Henri Prosper Gerdil
by
his Attorney

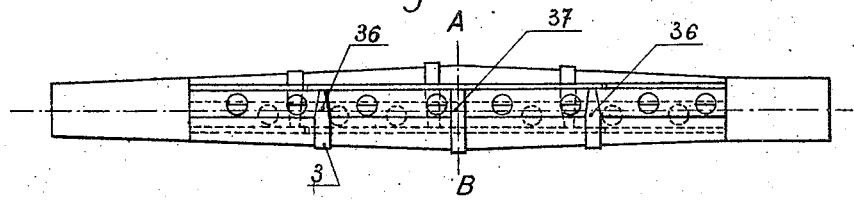
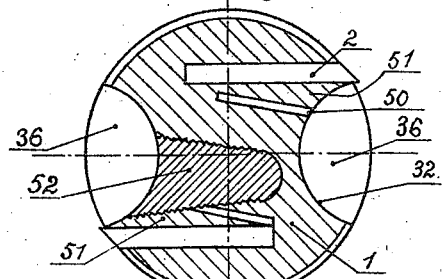
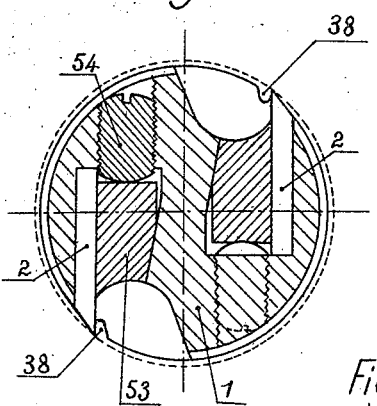
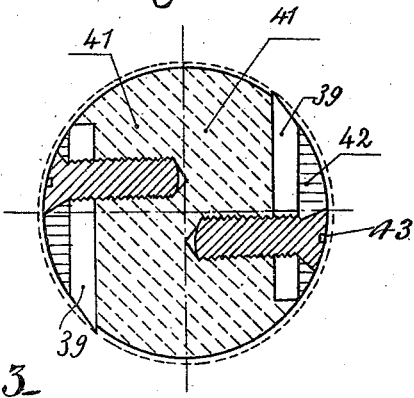
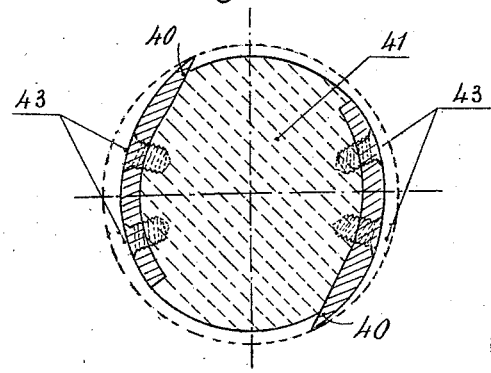

Patented Feb. 20, 1923.

1,446,342

UNITED STATES PATENT OFFICE.

HENRI PROSPER GERDIL, OF PARIS, FRANCE.

ROTARY CUTTING TOOL.

Application filed August 13, 1919. Serial No. 317,139.

*To all whom it may concern:*

Be it known that I, HENRI PROSPER GERDIL, a citizen of the French Republic, residing at 7 Rue Gustave Nadaud, Paris, in the Republic of France, have invented new and useful Improvements in Rotary Cutting Tools, of which the following is a specification.

This invention relates to improvements in rotary cutting tools used for working any materials.

One important feature of the invention consists in the fact that the tool comprises supporting surfaces with respect to which the cutting edges form a very reduced projection, so that in case of bending of the tool, the latter finds support by said surfaces on the wall of the incision made by the tool in the piece.

Other features of the invention will be described further on.

In the annexed drawings given by way of example:

Fig. 1 is a cross section of a two-bladed tool constructed according to the invention.

Figs. 2 and 3 are views of a tool respectively provided with transverse, and helicoidal supporting ribs.

Fig. 4 illustrates a tool provided with interrupted transverse supporting ribs.

Figs. 5 and 6 are respectively a view in elevation and a view in cross section on line A—B of Fig. 5, of a tool of which the cutting edges and supporting surfaces are formed on ribs.

Fig. 7 is a cross section of a single bladed tool of which the supporting ribs have projecting portions of an increased diameter.

Fig. 8 is a cross section of a similar tool with two blades.

Fig. 9 is a view of a tool provided with recesses and transverse partitions crossing the same.

Fig. 10 is a cross section thereof on line A—B of Fig. 9.

Fig. 11 is a cross section of a tool the partitions of which are provided with notches.

Fig. 12 is a cross section of a tool with straight blades without a core.

Fig. 13 is a section of a like tool with curved blades.

Fig. 1 shows the application of the invention to a rotary tool which can be supposed pivoted by its ends in a support and which is fed laterally in the direction of the arrow in order to make it cut into the piece of wood A (tree, etc.) with a view to cutting it up or making a mortise therein, the width of said piece being less than the length of the tool. The cylindrical core $l$ of the tool carries two blades.

Said blades are secured to the core by any desired means. Two chip receiving slots or grooves $1^b$ are formed in the core in front of the cutting edges. In order to enable the tool to rest during the operation upon the wall of the cut formed in the work while at the same time avoiding an excessive friction the tool is provided, according to the invention, with transverse circular ribs 3 which project from the core by a suitable distance. Such ribs are also shown in Fig. 2. The ribs may be otherwise arranged.

Fig. 3 shows spiral ribs $3^b$.

The ribs need not necessarily be continuous they can be interrupted and composed of parts arranged in a line or distributed in any way. Fig. 4 shows interrupted ribs 8.

These points of support, like the ribs, can be cut in the core or fixed thereto; they could also be elastic.

The number of the ribs and their dimensions vary according to the kind of tool, its work, the material to be worked, etc. They must be near enough together for guidance to be ensured and one of them at least to be engaged in the incision. Their width depends above all on the hardness of the material to be worked, it must be sufficient to oppose penetration. Finally their height, that is to say, the difference of radius between their outer surface and the surface of the core, may be extremely variable, also friction must be avoided without unnecessarily weakening the core.

When the cutting edges are cut in the tool body, the ribs have another important advantage. The edge must always project without there being "heeling." The projection diminishing at each sharpening would end by quickly disappearing. This leads to diminishing the core at the same time that the edge is sharpened. This lengthy and difficult work is simplified by means of the ribs, which it is sufficient to grind or file. At long intervals the core is hollowed out again between the ribs without troubling to strictly respect its outline. In this case the ribs must be rather deep.

Fig. 5 shows in elevation and Fig. 6 in cross section on the line A—B of Fig. 5 a tool 1 of this kind with two spiral cutting edges 11, 12. This tool is shaped as if it were to possess four cutting edges 9, 10, 11, 12. Two of these edges, 9 and 10, alternating with the others, are then so worked as to do away with the cutting-edge and reduce their diameter by some millimetres so that the circle described by their apices is found to be within the circle of the cutting edges 11, 12. These edges 9, 10, fulfill the function of spiral ribs and the cutting edges can be worn away without it being necessary to hollow out the core afresh. This construction would apply to tools with 6, 8, 10, etc., edges. It is not necessary for the pitch of the ribs to be the same as that of the cutting edges.

In the case of one-edged tools for boring or two-edged ones for cutting off or mortising, the guiding can be improved by giving a greater diameter to certain parts of the ribs.

Fig. 7 represents the cross section of a tool 1 with one edge. Assuming 13$^a$ to be the circumference described by one point of the cutting edge 13 of the blade 2 and 3$^a$ the circle corresponding to the periphery of the ribs 3. When the tool is at work it tends to bend until the ribs come to bear at $a$, $b$ on the wall of the hole. To obviate this bending the ribs can be excentered, that is to say, given a greater height in the part situated on the left of $a$ $b$; that is to say, in the zone opposite the blade, as shown at 14.

Fig. 8 represents the cross section of a tool 1 with two edges 23, 24, engaged in a mortise, shown at 17, 18 being assumed to be the circumference described by a point of the cutting edges, and 19 that of the ribs 3. When the active edge is near the point 24 the tool can bend until the rib catches at 21 on the wall of the mortise 17, and a space capable of attaining double the extent of the "projection" is produced in the zone $e$ $f$.

These flexions can be corrected by giving the ribs a greater diameter in two places $c$ $d$ and $e$ $f$, placed symmetrically and the axis of which is found on the perpendicular 21, 22 to the diameter 23, 24, uniting the two edges as indicated at 14. The circumferential development and the height of the raised portions depend on the material to be worked, on the speed and the rate of feed, etc. In order to avoid jamming the high and low parts of the ribs are joined by slight curves 25 and 26.

To reduce friction, the tool and especially the top of the ribs should be polished; all roughnesses should be removed and all angles tending to tear the material. In particular, behind the sloping edge of the blade the angular edge should be omitted and the core connected to the blade by a curve.

The chip receiving groove or slot might inconveniently discontinue the circular outline of the tool which would not be properly guided. This is remedied by partitioning the groove. Opposite the ribs 3 or elsewhere (Fig. 9) partitions 36, 37 are provided which form a bridge between the two lips of the notch or groove 32 and form circular supporting surfaces. Fig. 9 represents a groove with three partitions 36 37 situated in alignment with the ribs. These partitions, the number of which need not correspond with that of the rib, can be cut in the core or joined thereto and may be solid or hollow; their side surface can be parallel as indicated at 37, or sloped as indicated at 36, so as to end in a point in front of the cutting edge.

Figure 10 shows how the joined on blades 2 are secured; the core is provided with slits 50 which leave between them and the blades parts of material or tongues 51 having a certain mobility. By means of conic screws, screws with countersunk heads, or the like 52, which are screwed into the core, these tongues 51 are pushed back against the blades, so that the latter are solidly held in place by friction. The tongues 51 could also be separate from the core.

Inasmuch as chips might get inserted between the knife and the partition, the edge can be interrupted in front of the partition. In this case the partitions in the different grooves must be staggered in order that the material left by one knife may be removed by the following ones. A small notch can also be made in the partition, just under the cutting edge, so as to provide a space where the shaving, although piled up, can still be lodged. Fig. 11 represents a special tool, having partitions provided with this small groove or notch 38. The lateral edges must be connected to the groove by rounded parts in order to avoid "stuffings."

In this construction the blades 1 are secured by means of wedges 53 held by screws 54.

The tool can also have no core. In this particular case the partitions assume great importance; they connect the two knives by forming spacers. Fig. 12 represents a tool of this kind having two straight blades 39 separated by the partitions 41 forming spacing members and acting as ribs for supporting the tool against the work, the outer edges of these partitions being circular. Counter-plates 42 with circular outer faces and acting also as ribs are fixed to the partitions 41 by screws 43 extending through the knives. The counter-plates 42 can also be dispensed with. Fig. 13 shows a tool of this kind with curved blades 40. In operation, the tool will rest in its rotation upon the wall of the cut formed in the work by means of the circular outer edge of the partitions 41, and of the blades 40.

A tool could also be constructed on the same principle, with one straight or curved blade, the partitions of which would be still further extended in order to complete the circle and replacing one of the two ribs.

In the cutting off and mortising, if the speed is low, if the shaving is light, if the cutting in is deep and if obstacles are met with on the edges (fringes, burrs, etc.) the ejection is insufficient; the shavings accumulate in the cut-out section behind the tool, so that the latter when rotating not only is not disengaged from the shavings but brings them back, again cutting or "chewing" them and reducing them to powder. This inconvenience is wholly or partially moderated owing to the partitions of which the number is multiplied, the groove is then filled with more difficulty.

The invention is applicable to any known rotary cutting tools. The known rotary cutting tools can be improved, such as mortising drills, eye-drills, milling cutters, sinking and carving tools, rabbeting and grooving tools, variously shaped tools, circular planes, reamers, scraping and bleaching tools, etc.

The improved rotary chisels and cutting tools can be used for the cutting off, shearing, mortising, sinking, milling, moulding, dressing, rough-dressing, boring, etc., of all solids.

Having now described my invention what I claim as new and desire to secure by Letters Patent is:

1. A rotary cutting tool comprising a cutter having a cutting edge, a cutter carrying member and thin ribs on said cutter carrying member, said ribs having their blunt outer face slightly back of the surface of revolution described by the cutting edge in its rotation, said ribs being at an angle with the said surface of revolution, distributed substantially along the whole length of the cutting edge and bearing exclusively upon the wall of the cut formed in the work, said ribs being arranged in such a manner that there is always at least one rib in contact with the wall of the cut formed in the work.

2. A rotary cutting tool, comprising a cutter having a cutting edge, a cutter carrying member and thin ribs on said cutter carrying member, said ribs having their blunt outer face slightly back of the surface of revolution described by the cutting edge in its rotation, said ribs being at an angle with the said surface of revolution, distributed substantially along the whole length of the cutting edge and bearing exclusively upon the wall of the cut formed in the work, said ribs being arranged in such a manner that there is always at least one rib in contact with the wall of the cut formed in the work, said ribs being formed of separate sections having a reduced length.

3. A rotary cutting tool comprising a cutter having a cutting edge, a cutter carrying member affording a passage for the chips, and thin ribs on said cutter carrying member, said ribs having their blunt outer face slightly back of the surface of revolution described by the cutting edge in its rotation, said ribs being at an angle with the said surface of revolution, distributed substantially along the whole length of the cutting edge and bearing exclusively upon the wall of the cut formed in the work, said ribs being arranged in such manner that there is always at least one rib in contact with the wall of the cut formed in the work, said ribs extending across the passage for the chips.

In testimony whereof I have signed my name to this specification.

HENRI PROSPER GERDIL.